Dec. 4, 1945. A. J. PETERSON 2,390,269
FILTER DEVICE FOR COFFEE MAKERS
Filed Aug. 14, 1944 2 Sheets-Sheet 1

Inventor
Amos J. Peterson
by Ashworth Nelson Atty.

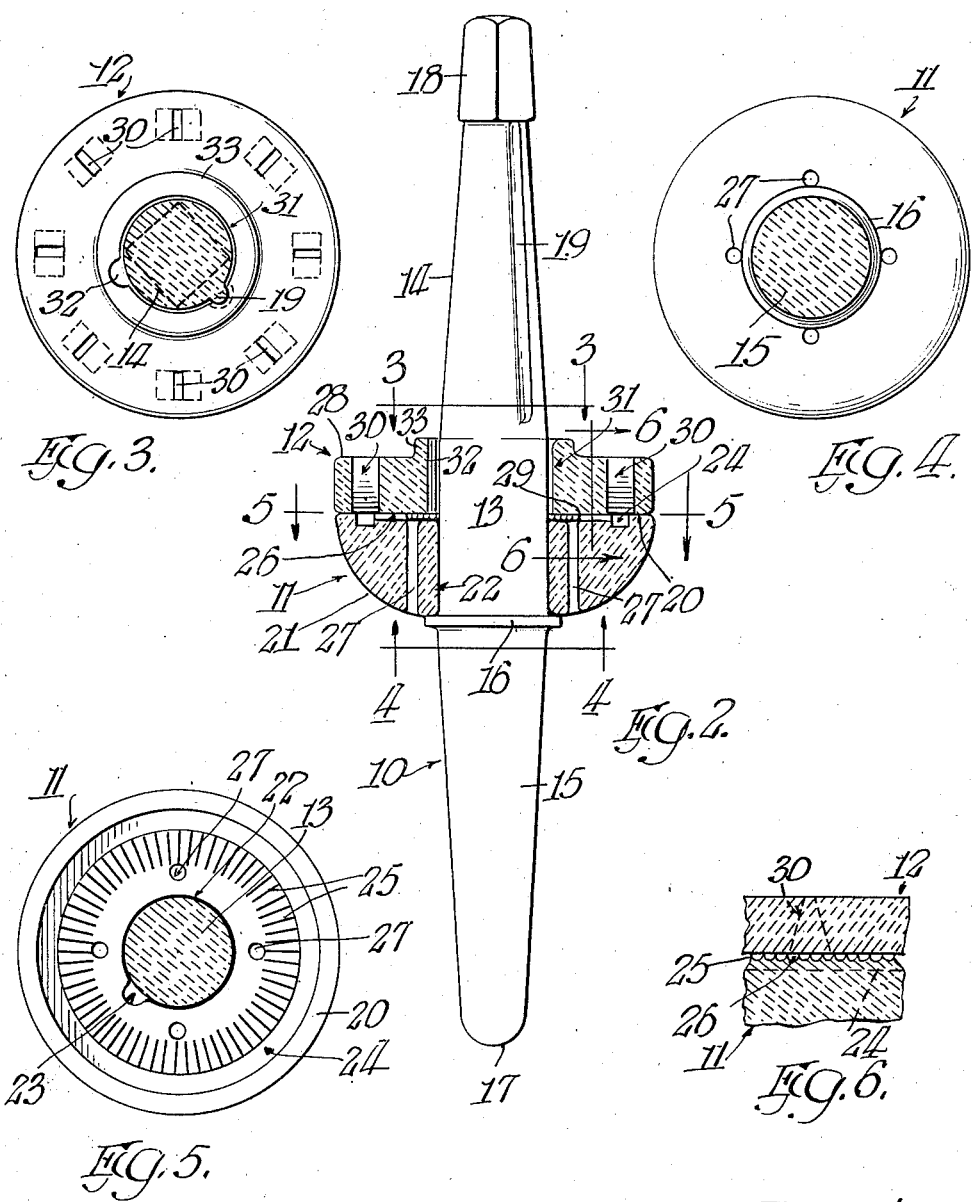

Patented Dec. 4, 1945

2,390,269

UNITED STATES PATENT OFFICE 2,390,269

FILTER DEVICE FOR COFFEE MAKERS

Amos J. Peterson, Berwyn, Ill., assignor to Club Aluminum Products Co., Chicago, Ill., a corporation of Delaware Application August 14, 1944, Serial No. 549,327

10 Claims. (Cl. 210—162)

This invention relates to improvements in filter devices for coffee makers and it consists of the matters hereinafter described and more particularly pointed out in the appended claims.

The improved filter device is especially adapted for use in connection with coffee makers of the so-called vacuum type that embody a lower boiling vessel and an upper steeping vessel and is so disposed in the latter vessel as to control the passage or interchange of fluid from one vessel to the other thereof.

One of the objects of the present invention is to provide a filter device of this kind which is practical to make of glazed ceramic material and which is easy to keep clean and sanitary.

Another object of the invention is to provide a device of this kind which provides an effective seal and filter between the lower and upper vessels of a coffee maker during a brewing operation.

A further object of the invention is to provide a filter device of this kind that comprises more than one part and which parts are formed to be readily disassembled for internal cleaning and then reassembled by a simple relative turning and longitudinal movement between said parts.

Again, it is an object of the invention to provide a filter device of this kind which will not readily tip from its operative position in its associated vessel and may be substituted for similar devices of coffee makers now in use.

The above mentioned objects of the invention, as well as others, together with the advantages thereof will more fully appear as the specification proceeds.

In the drawings:

Fig. 2 is a view of the filter device, on a scale enlarged over that of Fig. 1, showing the rod or stem thereof in elevation and the valve body and the valve member thereof in vertical section.

Figure 1:
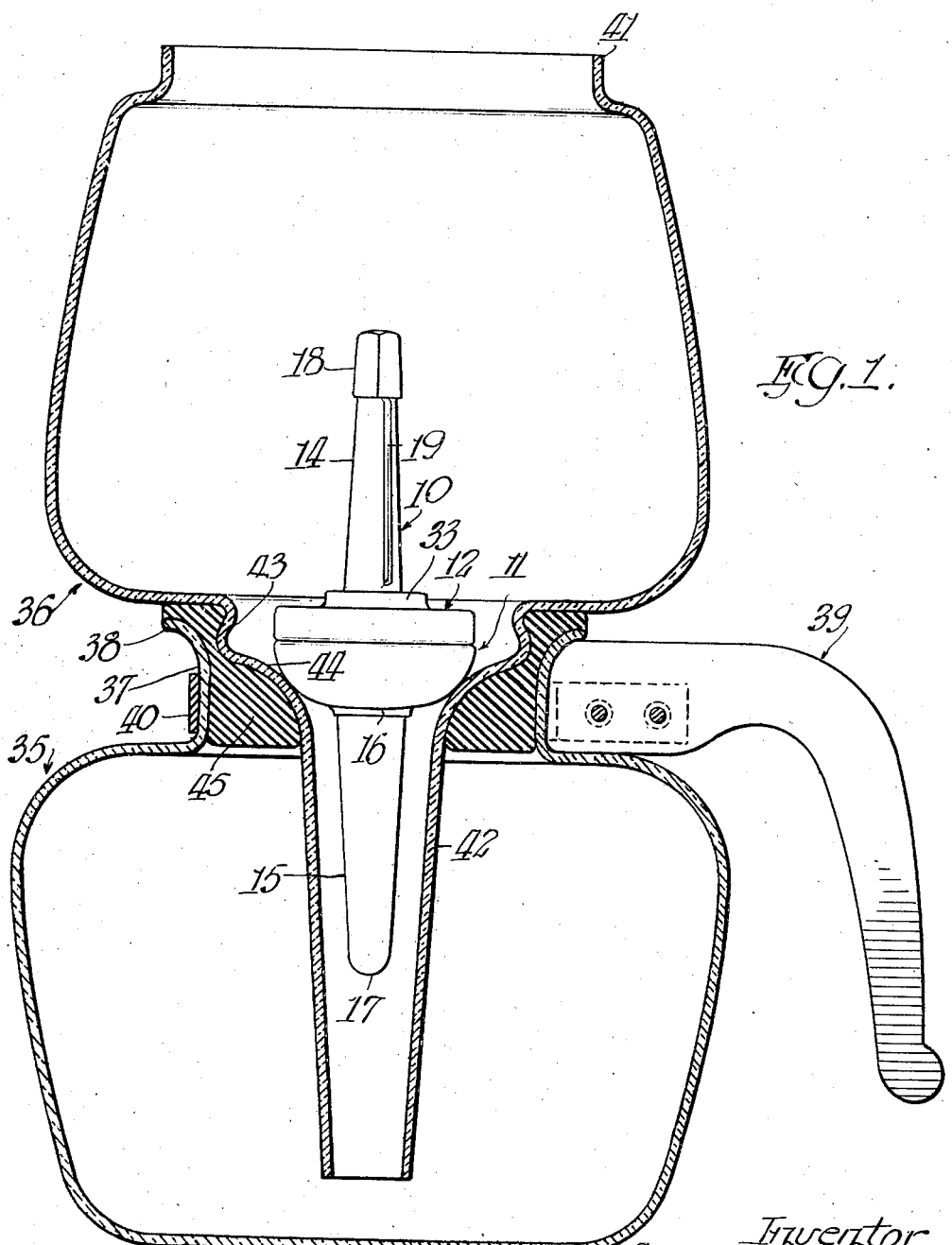
Fig. 1 is a view in side elevation of a filter device embodying the preferred form of the invention in operative position in a coffee maker of the type mentioned.

Figs. 3, 4 and 5 are horizontal detail sectional views through parts of the filter device shown in and on the scale of Fig. 2, as taken on the lines 3—3, 4—4 and 5—5 respectively of said Fig. 2.

Fig. 6 is a detail vertical sectional view through a part of the filter device as taken on the line 6—6 of Fig. 2.

Referring now in detail to that embodiment of the invention illustrated in the drawings, the improved filter device when made of a glazed ceramic material, for practical manufacturing purposes includes three parts, namely a rod or stem 10, a valve body 11 and a valve member 12, the valve body after its assembly upon the rod, being fused thereto so as to then form a substantially integral part thereof.

The rod 10 which constitutes the elongated supporting element of the device includes a cylindrical mid portion 13 and upper and lower end portions 14 and 15 respectively, which are substantially of the same length. The lower end portion joins the mid portion of the rod or stem 10 at an annular shoulder 16 and tapers toward its rounded bottom end 17. The upper end portion tapers from said mid portion toward a rectangular head 18 which provides a convenient shape for grasping the filtering device in applying it as a whole to and in removing it from the upper vessel of a coffee maker as will be later mentioned. The rectangular head has a cross-the-corner dimension slightly less than the diameter of the cylindrical mid portion 13 of the rod 10 as shown in dotted lines in Fig. 3. The upper end portion 14 is provided along one side with a longitudinal rib or spline 19 which projects at its bottom end into a position spaced radially outward from the periphery of the intermedial portion 13. The purpose of this rib will appear later.

The valve body 11, which has an axial length approximating half the length of the mid portion 13 of the rod 10, is substantially hemispherical and has a flat top 20, a rounded bottom 21 and a center bore 22 of a diameter to fit fairly snug upon the mid portion 13 of said rod. Opening into one side of the bore is a recess 23 (see Fig. 5) to accommodate the rib 19 when the valve body is assembled on the rod and at which time its bottom central portion engages upon the annular shoulder 16.

In the upper flat face 20 of the valve body, near its periphery, is an annular groove 24 and inwardly of said groove is a rosetted surface formed by a plurality of radially disposed ribs 25 separated by grooves or gullets 26 as best appears in Fig. 6. A series of relatively small passageways 27 is formed in the valve body parallel with the axis of the bore 22 and these passageways at their top end open through the surface 20 just inside the ribs 25 and at their bottom end open through the bottom of the valve body just outside of the periphery of the annular shoulder 16.

The valve member 12 is in the form of a disc of the same diameter as that of the valve body 11 and it has flat top and bottom surfaces 28 and 29 respectively, the latter surface being adapted for normal engagement upon the flat surface 20 of the valve body 11 when said valve body and disc are in position upon the rod. Toward the periphery of the disc and in register with the groove 24 of the valve body is a plurality of radially arranged openings 30. These openings are relatively narrow where they open through the top surface of the valve member and flare outwardly toward the bottom where they open through the bottom surface of the valve member to be comparatively wide. This flaring of said openings best appears in dotted lines in Fig. 6.

The valve member 12 is provided with a central bore 31 of a diameter to have a somewhat loose fit on the mid portion 13 of the rod 10 and opening into one side of said bore is a recess 32 which accommodates and passes over the rib 19 of the rod 10 when said recess is in register with said rib in applying the valve member to said rod. On the top surface 28 of the valve is an annular boss 33 which encompasses the bore and the recess just above mentioned.

It is pointed out that the valve body 11 is made separately from the rod 10 only for practical manufacturing purposes because when once in place upon the rod, it is not removed therefrom and functions as an integral part thereof, having been fused to the rod during manufacture.

In the assembly of the parts, a valve body 11 is applied to the rod 10 from its upper end portion 14 by first placing the bore 22 thereof over the head 18 and turning said valve body so that the recess 23 registers with the rib 19. The valve body is then lowered on the stem until it engages the shoulder 16, at which time said valve body is turned to move the recess 23 out of register with the rib. The valve body is then fused to the rod.

The valve member 12 may now be removably assembled upon the rod by placing its bore 31 over the head 18 of the rod 10 and then turning said valve body to cause the recess 32 to register with the rib 19 on said rod. The valve member is then lowered so that its bottom face 29 engages upon the top face 20 of the valve body 11. Thereafter the valve member 12 is turned to move the recess out of register with said rib. As will be noted from Fig. 2 when the valve member 12 is in position on the rod, the top surface of its annular boss 33 is spaced a short distance from the bottom end of the rib 19 so that the valve member is capable of an unlimited turning movement and a limited axial floating movement on the rod and away from and toward the valve body 11.

In Fig. 1 I have illustrated the improved filter device in operative position in a coffee maker embodying therein a lower boiling vessel 35 and an upper steeping vessel 36 both of which are preferably made of glass. The vessel 35 is provided at its top end in a neck 37 of restricted diameter which terminates in a flaring pouring lip 38. Said vessel is provided with a serving handle 39 which is operatively secured to the neck of the vessel by a metallic band 40 in the conventional way.

The upper vessel 36 has an open top 41 of substantial diameter and has a tapering central bottom tube 42 which joins the bottom of the vessel by means of a neck 43 that defines an annular valve seat 44 at the upper end of the stem 42. A sealing gasket 45 of rubber or the like is carried upon the neck 43 and this gasket is adapted to seat in the neck 37 of the lower vessel to there form a seal therefor.

In making a coffee brew, the vessels 35—36 are first separated and a suitable amount of water placed in the lower vessel. The upper vessel is then reapplied to the lower one, at which time the stem 42 thereof is spaced somewhat above the bottom of the lower vessel. The improved filter device as a whole is then placed in position in the upper vessel so that the rounded bottom of the valve body 11 engages in the seat 44, the lower end portion 15 of the rod guiding the insertion of the device in place as said portion enters the upper portion of the tube 42.

A proper amount of coffee, of the correct grind, is then placed in the upper vessel and the bottom of the lower vessel is then subjected to heat from a suitable source such as a gas flame or electric plate. When the water in the vessel 35 starts to boil, steam is generated in the upper portion thereof and this steam builds up to a pressure which forces the water in said vessel up the tube 42. As the ascending water reaches the bottom of the body 11, it enters and passes up through the passageways 27 and then out through the gullets 26 to the groove 24 and out through the openings 30 into the vessel 36. As this pressure builds up, it might operate to cause the valve member 12 to float upwardly so that the water passes out into the vessel through the space between the surfaces 20 and 29 of the valve body and valve member respectively. Should the pressure build up to a greater extent, it might cause the valve body 11 to move upward and off the seat 44 so that a greater volume of water enters the vessel 36.

When the level of the water in the lower vessel exposes the bottom end of the tube 42, upward flow of water ceases. When the temperature of the applied heat is reduced, a vacuous condition develops in the lower vessel and the filter engages upon the seat 44. The brew in the upper vessel then passes downwardly through the openings 30 into the groove 24 and then inwardly of the grooves or gullets 26 and out through the passages 27—27 into the lower vessel. In this passage of the brew, such ground coffee as tends to be carried over by the brew into the vessel 36 is filtered out first by the narrow slit-like ends of the openings 30—30 and then by the gullets 26 so that only a clear ground-free coffee brew or infusion passes to the vessel 36.

The upper vessel is now removed from the lower one so that the clear brew or infusion may now be served from the lower vessel in the usual way.

By grasping the knob or head 18, the entire device 10 may be removed from the vessel 36 for disassembly and cleaning. To disassemble, the valve member 12 is turned to bring the recess 32 into register with the rib 19 and then removed endwise of the upper end portion 14 of the rod. This exposes all surfaces of the device for cleaning.

The improved filter device is simple in construction, is easily manipulated and readily cleaned and sterilized.

It is preferred that the body part 11 be fused or otherwise permanently secured to the rod as this reduces the number of separable parts which need cleaning but if desired the part 11 could remain as a separable part without destroying the functioning of the filter.

While in describing the invention I have referred in detail to the form and arrangement of the parts thereof, the same is to be considered only in the illustrative sense and therefore I do not wish to be limited thereto except as may be specifically set forth in the appended claims.

I claim as my invention:

1. A filter device for a coffee maker of the kind described and embodying therein an elongated supporting rod, a valve-like body on said rod between its ends and a member mounted on said rod above said body for an axial and a turning movement, said body and member having normally engaging faces, said body and said member each having a series of passageways therethrough arranged in a direction generally lengthwise of but different distances from said rod, there being an annular groove in one of said faces in line with one of said series of passageways, and means on one of said faces providing communication between said annular groove and the other series of said passageways.

2. A filter device for a coffee maker of the kind described and embodying therein an elongated supporting rod, a valve-like body on said rod between its ends and a member mounted on said rod above said body for an axial and a turning movement, said body and member having normally engaging faces, said body and said member each having a series of passageways therethrough arranged in a direction generally lengthwise of but different distances from said rod, said body having an annular groove in its face with which the passageways in said member communicate, said face having ribs thereon with gullets therebetween which provide communication between said groove and the series of openings in said member.

3. A filter device for a coffee maker of the kind described and embodying therein an elongated supporting rod, a valve-like body on said rod between its ends, a member mounted on said rod above said body and having a face normally engaged with a face on the body, said body and said member each having a series of passageways therethrough arranged in a direction generally lengthwise of said body, and means on one of said faces affording communication between the passageways of said body and said member respectively at said engaging faces of said body and said member respectively, and coacting parts on said rod and on said member respectively, which when said rod and said member are turned out of register prevent endwise removal of said member from said rod, said parts when in register permitting endwise removal of the member from said rod.

4. A filter device for a coffee maker of the kind described and embodying therein an elongated supporting rod, a valve-like body on said rod between its ends, a member mounted on said rod above said body and having a face normally engaged with a face on the body, said body and said member each having a series of passageways therethrough arranged in a direction generally lengthwise of said body, and means on one of said faces affording communication between the passageways of said body and said member respectively at said engaging faces of said body and said member respectively, a rib on said rod above said member and a recess in said member for cooperation with said rib, said recess and rib when out of register preventing withdrawal of the member from said rod, said recess and rib when in register permitting a withdrawal of the member endwise from said rod.

5. A filter device for a coffee maker of the kind described and embodying therein an elongated supporting rod, a valve-like body on said rod between its ends and a valve member mounted on said rod above said body for an axial and a turning movement, said body and said member having normally lower and upper engaging faces, said body and said member each having a series of passageways therethrough in a direction generally lengthwise of but different distances from said rod, said passageways in said member flaring downwardly toward its lower face and opening into an annular groove in the upper face of said body, and means on one of said faces providing communication between said groove and the passageway in said body.

6. A filter device for a coffee maker of the kind described embodying therein an elongated supporting rod of molded material, a valve-like body fused to said rod between its ends and a member mounted on said rod above said body for axial and a turning movement, said body and said member having normally engaging faces and passageways arranged in a direction generally lengthwise of said rod, and means on one of said faces providing for communication between said passageways with each other at said engaging faces.

7. A filter device for a coffee maker of the kind described and embodying therein an elongated supporting rod, a body carried by a mid portion of said rod for engagement upon an annular seat-like part of said coffee maker, said body having fluid passages therethrough within the circle of said seat-like part, and a member removably mounted on said rod above said body for a turning and a longitudinal movement, said member having fluid passages therethrough disposed out of register with those in said body, said body and said member having opposed faces when said member is mounted on said rod, the passages in said body and in said member respectively opening at one end through respective faces, and means on at least one of said faces providing passageways between said faces affording communication between the ends of the passages in said body and in said member respectively where they open through said faces.

8. A filter device for a coffee maker of the kind described and embodying therein an elongated supporting rod, a body carried by a mid portion of said rod for engagement upon an annular seat-like part of said coffee maker, said body having fluid passages therethrough within the circle of said seat-like part, and a member removably mounted on said rod above said body for a turning and a longitudinal movement, said member having fluid passages therethrough disposed out of register with those in said body, said body and said member having opposed faces when said member is mounted on said rod, the passages in said body and in said member respectively opening at one end through respective faces, there being an annular groove in one of said faces with which the ends of the passages that open through the other face communicate, and means on said one of said faces providing passageways affording communication between said annular groove and the ends of the passages that open through said one of said faces.

9. A filter device for a coffee maker of the kind described and embodying therein an elongated supporting rod, a body carried by a mid portion of said rod for engagement upon an annular seat-like part of said coffee maker, said body having fluid passages therethrough within the circle of said seat-like part, a member removably mounted on said rod above said body, coacting means on said rod and member respectively permitting a turning movement of the member on said rod while preventing longitudinal withdrawal therefrom except when said member is in such a position that said coacting means register with each other, said member having fluid passages therethrough disposed out of register with those in said body, said body and said member having opposed faces when said member is mounted on said rod, the passages in said body and in said member respectively opening at one end through respective faces, and means on at least one of said faces providing passageways between said faces affording communication between the ends of the passages in said body and in said member respectively where they open through said faces.

10. A filter device for a coffee maker of the kind described and embodying therein an elongated supporting rod, a body carried by a mid portion of said rod for engagement upon an annular seat-like part of said coffee maker, said body having fluid passages therethrough within the circle of said seat-like part, and a member removably mounted on said rod above said body, a lateral projection on said rod above the top end of said member when mounted on said rod and which member has a groove therein for lining up with said projection in applying the same to and in removing it from said rod, said member having fluid passages therethrough disposed out of register with those in said body, said body and said members having opposed faces when said member is mounted on said rod, the passages in said body and in said members opening at one end through the respective faces, and means on at least one of said faces affording communication between the ends of the passages in said body and in said member respectively where they open through said faces.

AMOS J. PETERSON.